US00RE41348E

(19) United States
(12) Reissued Patent
Frederick et al.

(10) Patent Number: US RE41,348 E
(45) Date of Reissued Patent: May 25, 2010

(54) MULTI-BRANCH JUNCTION OVERWRAP

(75) Inventors: Matthew P. Frederick, West Chester, PA (US); Eric K. Staudt, Jeffersonville, PA (US); Yuriy Roman-Leshkov, Philadelphia, PA (US); John A. Barber, Jr., Paoli, PA (US); Thomas M. Flickinger, West Bloomfield, MI (US); Robert K. Wolski, Walled Lake, MI (US)

(73) Assignee: Federal-Mogul World Wide, Inc., Southfield, MI (US)

(21) Appl. No.: 11/933,767

(22) Filed: Nov. 1, 2007

Related U.S. Patent Documents

Reissue of:
(64) Patent No.: 6,960,722
Issued: Nov. 1, 2005
Appl. No.: 10/791,230
Filed: Mar. 2, 2004

U.S. Applications:
(60) Provisional application No. 60/451,819, filed on Mar. 4, 2003.

(51) Int. Cl.
*H02G 3/00* (2006.01)

(52) U.S. Cl. ..... 174/72 R; 174/117 F; 174/92; 138/121

(58) Field of Classification Search ..... 174/72 R, 174/92, 74 A, 117 F, 93, 71 R, 36, 68.1, 68.3; 138/121, 166; 285/156
See application file for complete search history.

(56) References Cited

U.S. PATENT DOCUMENTS

| | | | | |
|---|---|---|---|---|
| 2,258,745 | A | | 10/1941 | Dewey et al. |
| 2,941,027 | A | | 6/1960 | Svec |
| 3,192,377 | A | | 6/1965 | Abolins |
| 3,312,777 | A | * | 4/1967 | Lovett, Jr. et al. ..... 174/71 |
| 3,711,633 | A | * | 1/1973 | Ghirardi et al. ..... 174/135 |
| 4,384,167 | A | | 5/1983 | Nestor |
| 4,457,068 | A | | 7/1984 | Maier, Jr. |
| 5,053,582 | A | | 10/1991 | Terakawa et al. |
| 5,115,105 | A | | 5/1992 | Gallusser et al. |
| 5,352,855 | A | * | 10/1994 | Potter ..... 174/135 |
| 5,378,853 | A | | 1/1995 | Clouet et al. |
| 5,394,502 | A | | 2/1995 | Caron |
| 5,723,820 | A | | 3/1998 | Whitney et al. |

(Continued)

FOREIGN PATENT DOCUMENTS

| | | |
|---|---|---|
| DE | 4107763 | 9/1991 |
| FR | 2780850 | 7/1998 |
| GB | 2432710 | 3/2003 |

OTHER PUBLICATIONS

Abstract of Japanese Patent No. JP9117034, published May 2, 1997, entitled Branch Sheet for Wire Bundle and Bundling Method at Branch Part (Shoji).*

*Primary Examiner*—Dhiru R Patel
(74) *Attorney, Agent, or Firm*—Robert L. Stearns; Dickinson Wright PLLC

(57) ABSTRACT

A multi-branch overwrap for protecting elongated items is disclosed. The overwrap is formed from a flexible, resilient substrate. Interengageable attachments are positioned on opposite sides of the substrate for releasably attaching one surface of the substrate to the other. The substrate may be biased to form a plurality of interconnected tubes or reverse folded to form channels that receive the elongated items. Biasing or folding brings the opposite sides of the substrate into overlapping relation. The overwrap may be formed from a unitary blank or assembled from component parts. Preferred materials for the substrate include polyester felt, and preferred attachments include hook and loop fasteners distributed on the surface of the substrate.

22 Claims, 6 Drawing Sheets

U.S. PATENT DOCUMENTS 6,125,534 A 10/2000 Varreng
6,224,433 B1 5/2001 Chadbourne et al.
6,255,584 B1 7/2001 Renaud
6,288,337 B1 9/2001 Sato et al.
6,384,326 B1 5/2002 McFadden et al.
6,476,322 B1 11/2002 Dunne et al.
6,822,166 B2 11/2004 James et al.
6,875,918 B2 * 4/2005 Sudo et al. ..... 174/363

* cited by examiner

FIG.10
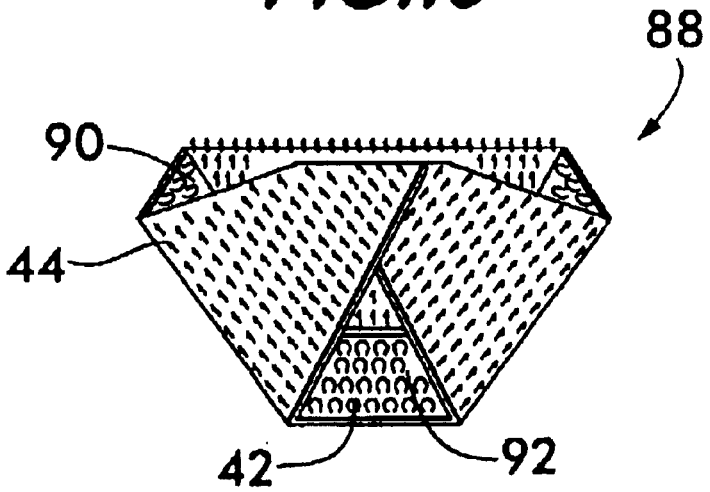
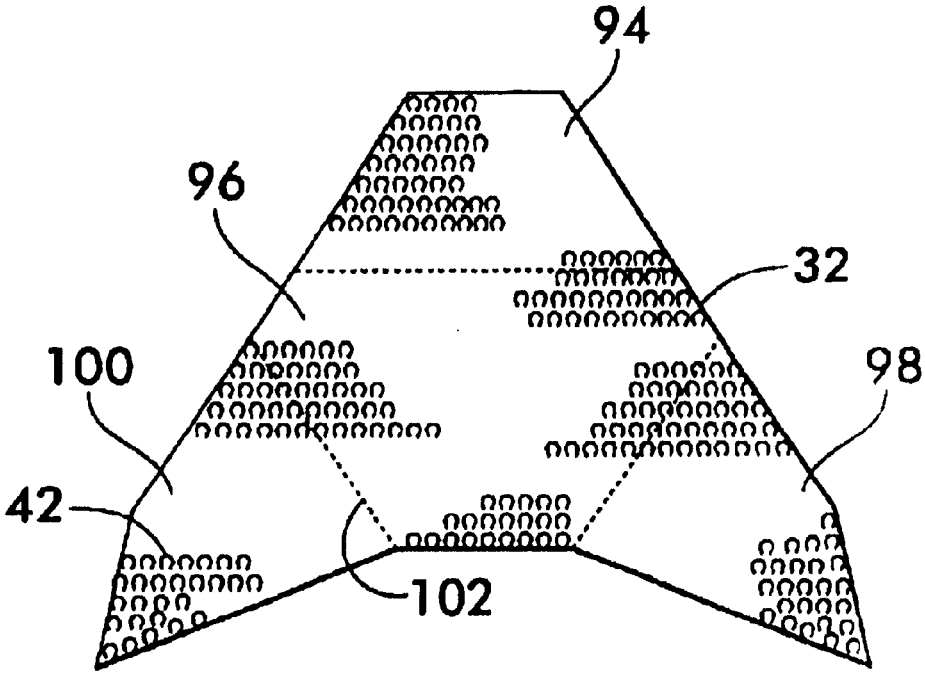
FIG.11

MULTI-BRANCH JUNCTION OVERWRAP

Matter enclosed in heavy brackets [ ] appears in the original patent but forms no part of this reissue specification; matter printed in italics indicates the additions made by reissue.

This application claims the benefit of U.S. Provisional Application No. 60/451,819 filed Mar. 4, 2003.

FIELD OF THE INVENTION

This invention concerns pre-shaped covers positionable at junctions where two or more branches of elongated items are joined to another branch for protecting the elongated items against damage due to cuts, chafing and abrasion.

BACKGROUND OF THE INVENTION

Elongated items such as wiring harnesses used in automotive, marine and aerospace applications are preferably ensheathed in a protective covering which extends along the length of their run. The covering may be, for example, flexible convolute tubing formed of a polymeric material. Such tubes have sufficient stiffness to hold the various wires comprising the harness in an organized bundle and thus provide for a neat installation. The tubes are also sufficiently flexible to conform to curved paths which the harness may be forced to take when routed through an automotive or aircraft structure. The tubes provide a tough, abrasion resistant exterior which protects the wires of the wiring harness from damage which would otherwise occur when the harness rubs against structure in response to vibration.

However, at branch points in the wiring harness where two or more branches of the harness separate from another branch to follow different paths, the convolute tubing is present on each branch but stops short of the actual junction. This leaves a length of each branch at or near the junction exposed to damage by cuts and abrasion. In fact, the protective tubing itself can be a source of abrasion damage because the harness can chafe against the sharp edge of the convolute tubing formed at the tube end where it was cut to accommodate the branching of the harness.

This problem is often addressed by wrapping the wiring harness at the junction with flexible, self-adhesive tape, for example, vinyl electrical tape. While this solution provides some degree of protection to the harness at the junction, it suffers the following disadvantages. The tape stiffens the harness at the junction, making it less accommodating to the path it must assume. The tape is never applied, in practice, in a standard or uniform manner, resulting in some junctions having too much tape and some too little. Furthermore, the tape requires considerable time to install, and once installed, the tape, due to its adhesive nature, prevents ready access to the harness for repairs or splices. To effect a repair or a splice, the tape must be laboriously removed by hand each time the junction is serviced. The tape is usually applied over both the harness and the convolute tubing and does not provide any protection against chafing of the harness wires by the sharp edge at the end of the tube. Clearly, there is a need for an article which protects wiring harness junctions which eliminates the use of adhesive tape and its many disadvantages.

SUMMARY OF THE INVENTION

The invention concerns an overwrap for protecting elongated items. The overwrap comprises a flexible substrate having first and second surfaces oppositely disposed. A first attachment means is positioned on the first surface and extends substantially thereover. A second attachment means is positioned on the second surface and extends substantially thereover. The second attachment means is engageable with the first attachment means for removably attaching the first and second surfaces to one another when the first surface is brought into contact with the second surface.

Preferably, the first attachment means comprises a multiplicity of hooks extending from the first surface and the second attachment means comprises a multiplicity of loops extending from the second surface.

The substrate may be resiliently biased so as to form a tube wherein a portion of the first surface overlies a portion of the second surface. The tube has a central space for receiving the elongated items, the first and second surface portions being engageable with one another to affix the tube around the elongated items.

The tube may comprise a first tubular segment defining a first central space and a second tubular segment defining a second central space. The first and second tubular segments are connected to one another with the first and second central spaces in communication with one another.

In an alternate embodiment, the overwrap comprises a first substrate portion that is turned back upon a remainder of the substrate to form a reverse fold. The reverse fold defines a channel between the first substrate portion and the remainder for receiving the elongated items. A second substrate portion is turned back upon the remainder of the substrate into overlapping relation with the first substrate portion. The first attachment means on one of the first and second substrate portions engages the second attachment means on the other of the first and second substrate portions to hold the first and second substrate portions in overlapping relation to secure the reverse fold defining the channel.

BRIEF DESCRIPTION OF THE DRAWINGS

FIG. 10 is a plan view of another embodiment of an overwrap; and

FIG. 11 is a plan view of a substrate blank used to form the overwrap shown in FIG. 10..

DETAILED DESCRIPTION OF THE EMBODIMENTS

Figure 1:
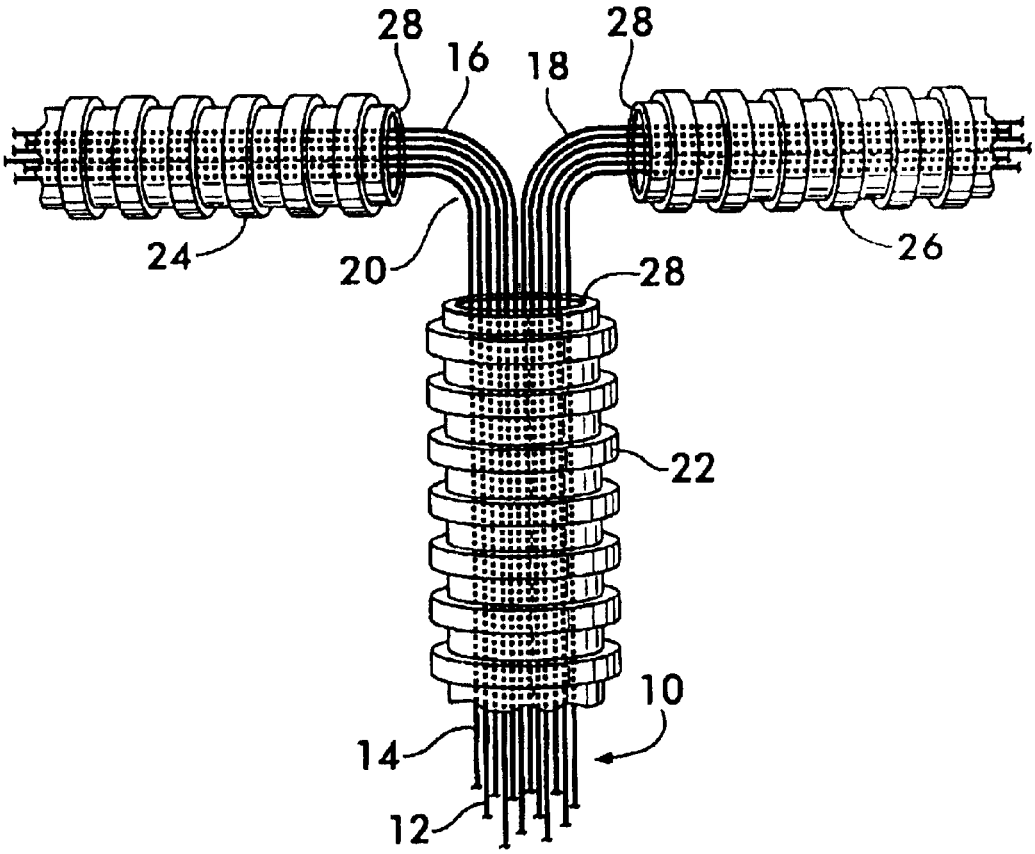
FIG.1 (PRIOR ART)
FIG. 1 is a plan view of a wiring harness junction showing various branches protected by convolute tubing.

FIG. 1 shows a wiring harness 10 formed of a bundle of wires 12, the wires separating from a main branch 14 into two branches 16 and 18 at a junction 20. Each branch 14, 16 and 18 is ensheathed by a protective covering, in this example, flexible convolute tubing 22, 24 and 26. The tubing extends substantially over the length of the various branches but does not cover the junction 20 where the wires are exposed to damage by cuts and abrasion. The edges 28 formed at or adjacent to junction 20 where tubes 22, 24 and 26 have been cut to length are themselves a potential source of abrasion damage to wires 12, which will rub against the edges 28 when subjected to vibration.

Figure 2:
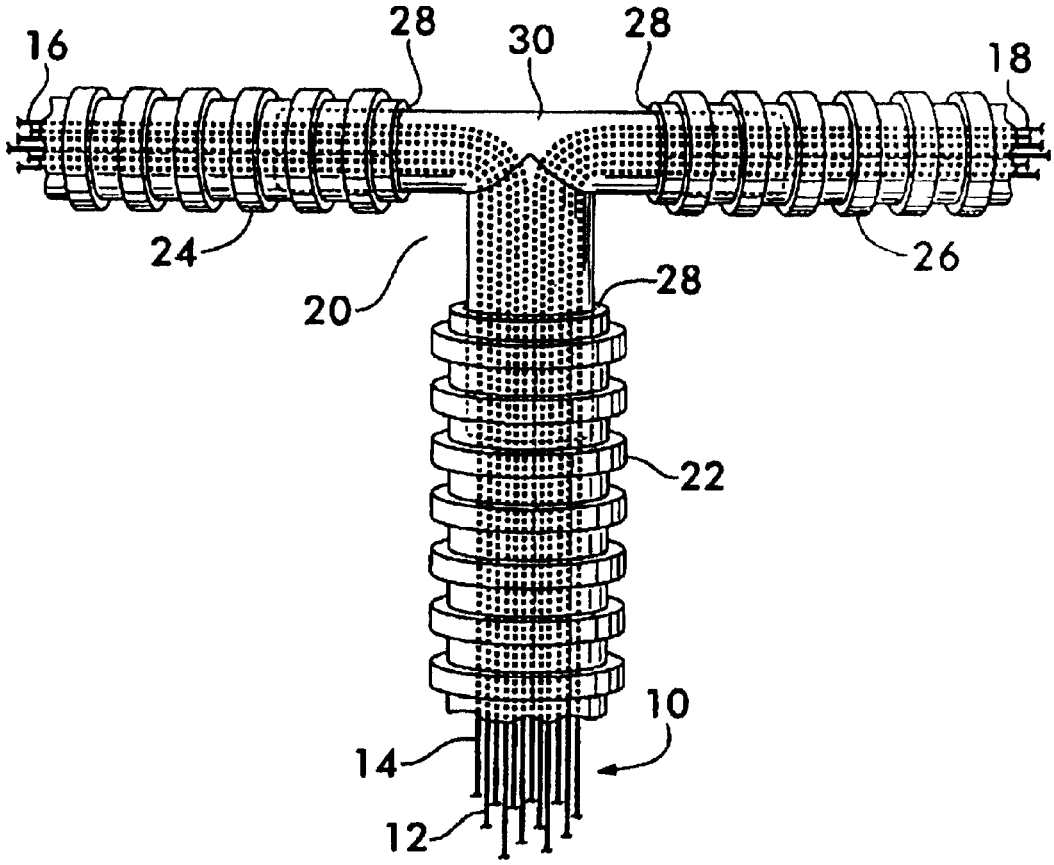
FIG. 2 is a plan view of the wiring harness of FIG. 1 wherein a multi-branch junction overwrap is installed to protect the junction.

As shown in FIG. 2, a multi-branch junction overwrap 30 according to the invention is positioned over the wiring harness 10 at junction 20. Overwrap 30, various embodiments of which are described in detail below, extends along each branch 14, 16 and 18 from the junction 20 over a predetermined length of harness sufficient to be positioned coaxially within the tubes 22, 24 and 26 so as to be between the edges 28 and the wires 12 to prevent chafing and abrasion of the wires by the tube edges.

Figure 3:
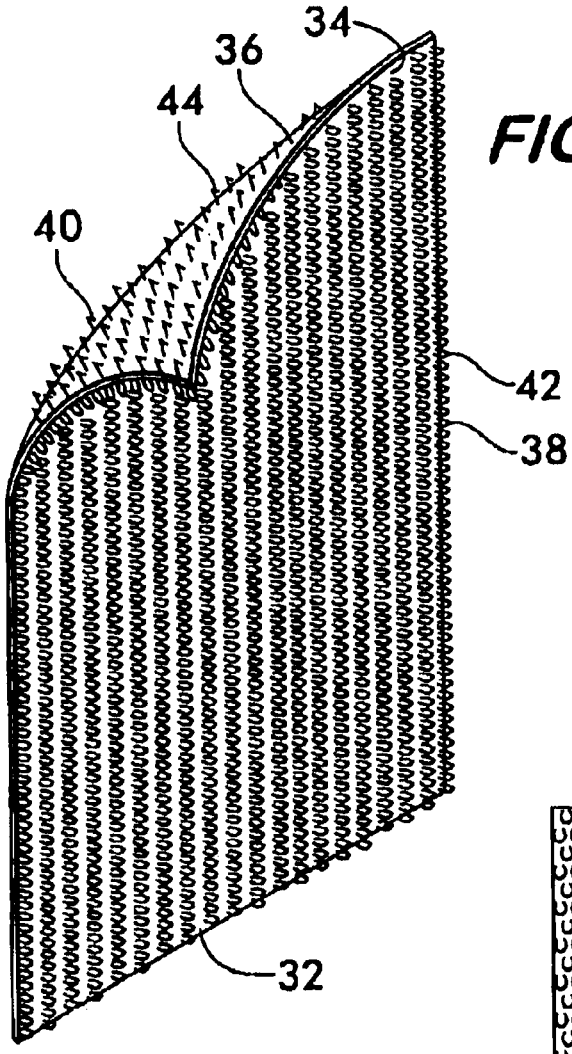
FIG. 3 is a perspective view of a substrate used to form the overwrap according to the invention.

Preferably, as shown in FIG. 3, the overwrap 30 is formed from flexible resilient substrate 32 having good wear characteristics enabling it to withstand vibration induced abrasion. Substrate 32 has a first surface 34 and an oppositely disposed second surface 36. The surfaces 34 and 36 have respective attachment means 38 and 40 that extend substantially over them. The attachment means 38 and 40 are compatible with one another in that they allow surface 34 to be removably attached to the surface 36 when the surfaces are brought into engagement. Such attachment means include, for example, loops 42 and hooks 44 distributed over the surfaces 34 and 36 respectively which allow the surfaces to be attached to and released from one another repeatedly.

It is advantageous that the substrate 32 comprise a nonwoven material, preferably nylon felt. Nylon has excellent abrasion resistance and may be resiliently biased into a tubular shape, as described below, to provide a convenient form adapted to the elongated items such as wiring harness 10 which the overwrap 30 is to cover and protect. Nylon felt also has the advantage of providing the loops 42 to which the hooks 44 will attach without the need for the attachment of a separate component to the substrate. Other materials, such as polyester, polypropylene, polyethylene, polyethylene terepthalate and polytetrafluoroethylene are also feasible. Furthermore, substrate 32 may be a substantially continuous membrane or may also be woven or knitted from filamentary members.

Figure 4:
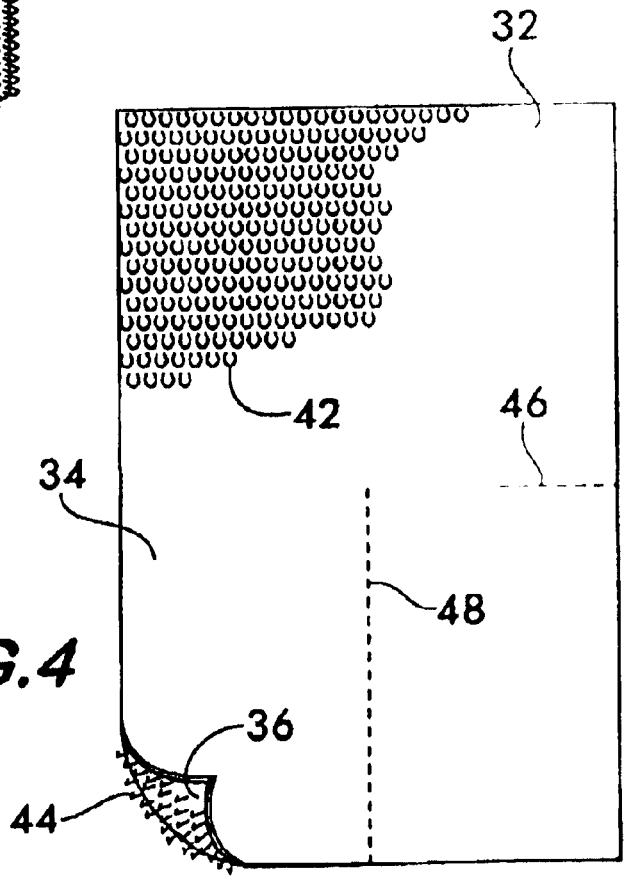
FIG. 4 is a plan view of a substrate blank for forming an overwrap.

Substrate 32 may be processed in various ways to yield a plurality of overwrap designs. As shown in FIG. 4, substrate 32, having a rectangular shape, is partially cut along dotted lines 46 and 48 and then resiliently biased into a tube. Biasing may be effected by heating the substrate and mechanically curving it into the tubular shape, as well as by chemical and cold-working means depending upon the substrate material. Once the substrate 32 is cut and biased into a tube, a particular overwrap embodiment 50, shown in FIG. 5, may be formed by separating tubular segments 52 and 54 from one another to yield a Y-shaped overwrap. Cuts 46 and 48 allow the tubular segments 52 and 54 to be conveniently defined from a unitary sheet of substrate 32.

Figure 5:
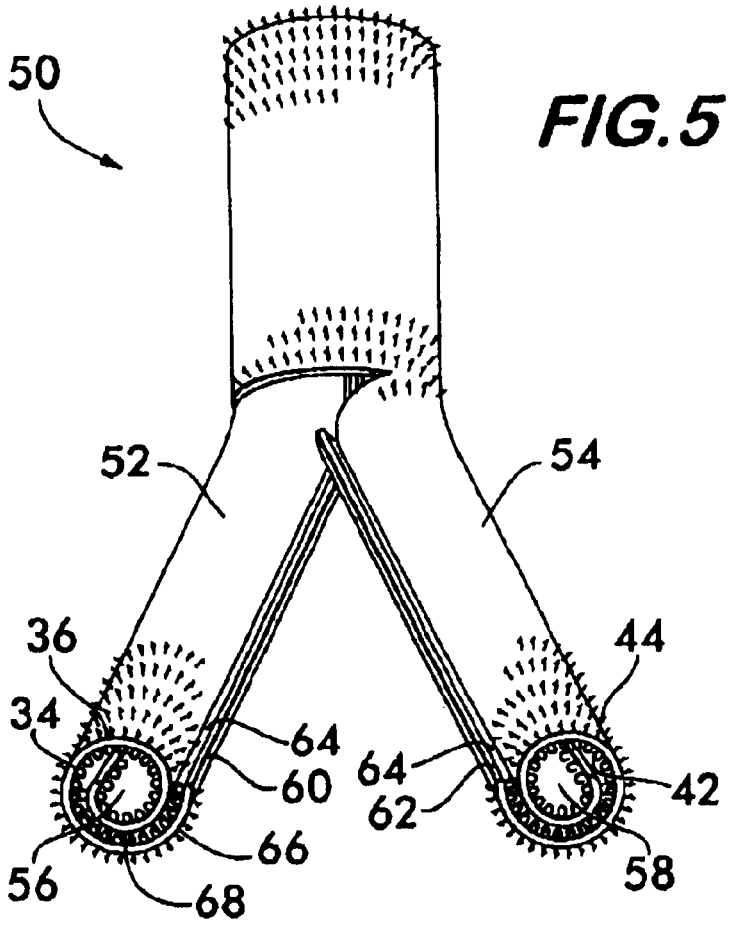
FIG. 5 is an embodiment of an overwrap according to the invention formed from the substrate blank shown in FIG. 4.

As illustrated in FIG. 5, the tubular segments 52 and 54 of overwrap 50 each define a central space 56, 58 that receives the elongated items. The central spaces 56 and 58 are in communication with one another to allow branches of the elongated items to join or break away from one another. Cut line 48 (see FIG. 4) defines edges 60 and 62 that define slits 64 which provide openings for access to the central spaces 56 and 58. Tubular segments 52 and 54 are biased so that a portion 66 of the first surface 34 overlies or overlaps a portion 68 of the second surface 36. This overlying/overlapping relation between the surface portions allows the attachment means 38 and 40 (shown in FIG. 3) on opposite surfaces 34 and 36 to engage one another and effect a releasable attachment between the surfaces, closing the openings 64. Preferably, the biasing is such as to initially produce an extensive overlap of the portions 66 and 68. This extensive overlap allows the overwrap 50 to be used on a wide range of elongated items having different diameters, the overwrap being easily adjustable to accommodate the various diameters. Note that for the tubular overwrap 50, one or the other of the surfaces 34 and 36 will face outwardly, the other facing inwardly toward the central space. Which particular surface faces in which direction will depend upon the type of attachment means employed and the environment that the elongated items are expected to see. For example, it may be advantageous to position the surface having the loop attachment means facing inwardly so that the loops provide damping to the elongated items and do not accumulate foreign matter.

Figure 6:
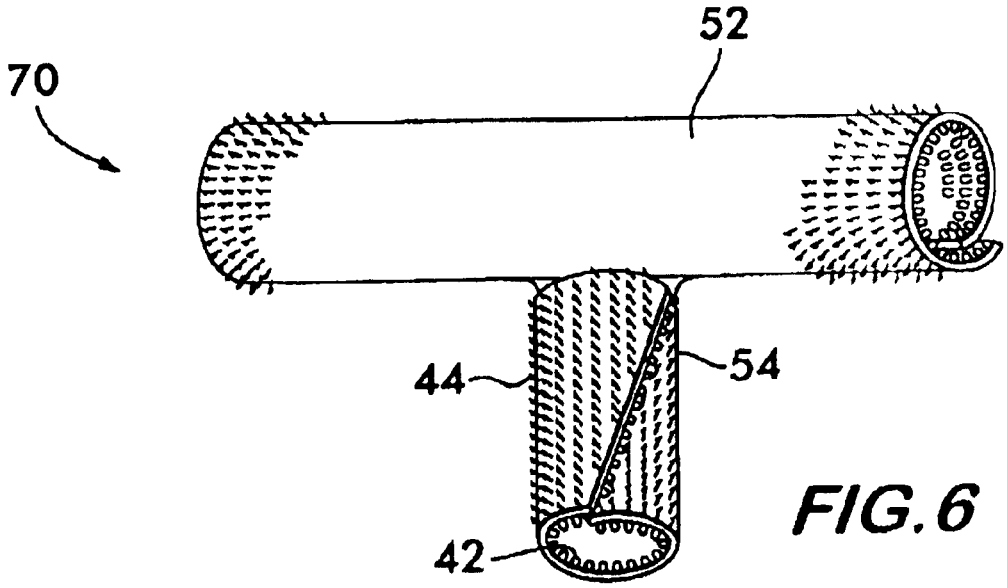
FIG. 6 is a perspective view of another embodiment of an overwrap.
Figure 7:
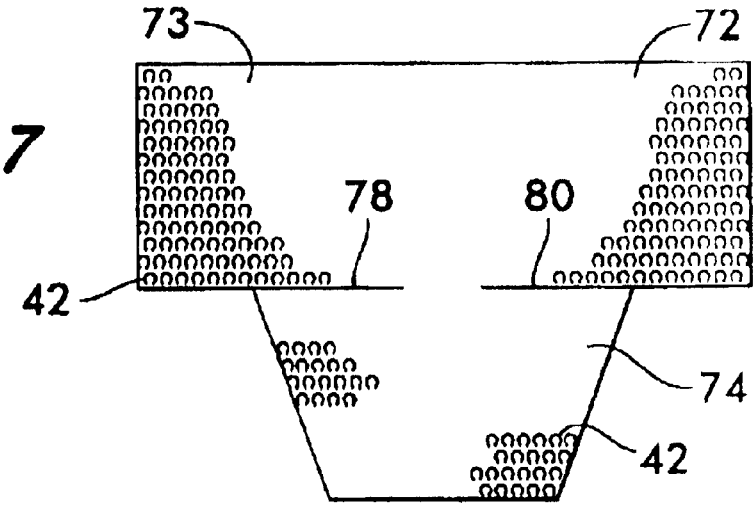
FIG. 7 is a plan view of a substrate blank for forming the overwrap shown in FIG. 6.

The overwrap according to the invention need not have a Y-shape. Tubular segments 52 and 54 may have any of various proportions or angular orientations relatively to one another. Depending upon the elongated items, a right or 90° orientation may be preferred as shown in embodiment 70 in FIG. 6. FIG. 7 illustrates a unitary blank 72 from which overwrap 70 is formed. Blank 72 has a rectangular portion 73 and a trapezoidal portion 74, the two portions being partially separated from one another by cuts 78 and 80. The cuts so placed allow the rectangular portion 73 to form tubular segment 52 and the trapezoidal portion 74 to form tubular segment 54 when the blank 72 is biased.

Figure 8:
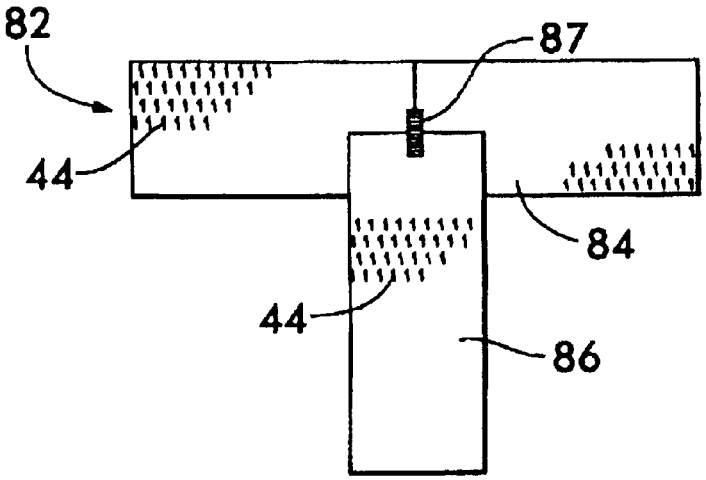
FIG. 8 is a plan view of another embodiment of an overwrap.
Figure 9:
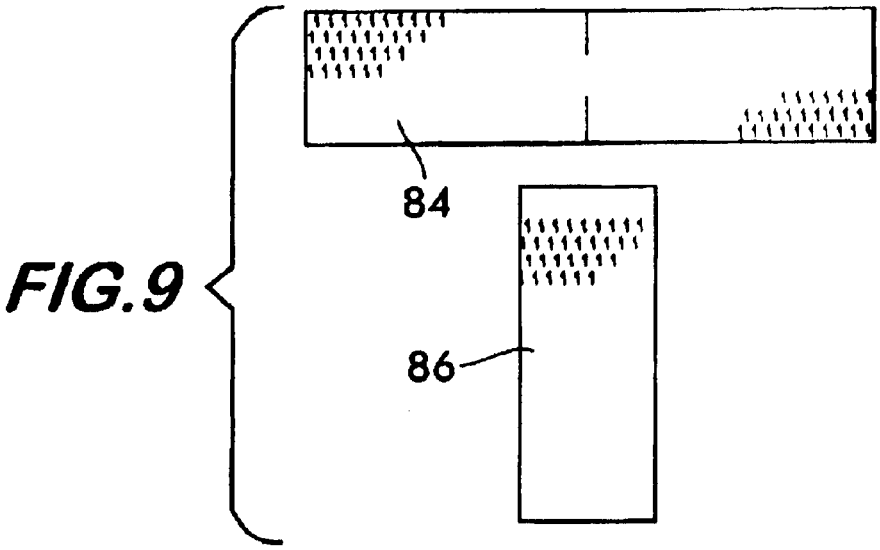
FIG. 9 is an exploded view showing the components used to form the overwrap illustrated in FIG. 8.

FIG. 8 shows an overwrap 82 assembled from individual pieces of substrate 84 and 86, illustrated in FIG. 9. The substrate pieces have attachment means as illustrated in FIG. 3 and are preferably joined to one another by an ultrasonic weld 87, but could also be sewn or adhesively bonded together.

As shown in FIG. 10, an overwrap 88 according to the invention need not be tubular in shape but may comprise a plurality of channels 90 and 92 that receive the elongated items. Overwrap 88 is formed from a substrate 32, shown in FIG. 11, by first folding or turning a substrate portion 94 back upon a remainder 96 of the substrate to form the channel 90, and then turning or folding one or more other substrate portions 98 and 100 into overlapping relation with the substrate portion 94 so that channel 92 is formed and one attachment means, for example, 42, on one surface of substrate portions 98 and 100 engages the other attachment means 44 on an opposite surface of the substrate portion 94. The attachment means holds the substrate 32 in the shape that defines channels 90 and 92 so that the overwrap 88 may receive, surround and protect elongated items at a junction.

Preferably, substrate 32 of FIG. 11 is cut into a desired shape that will fold conveniently and define the requisite channels. To further assist a technician in the use of the overwrap 88, score lines 102 may be positioned on the substrate 32 to define the nature of the folds needed. The score lines 102 may be grooves cut partially through the substrate or may merely be printed lines on one or both substrate surfaces. Other indicia, indicative of the order for folding or defining the inner and outer surfaces of the channel, may also be printed on the substrate 32.

Multi-branch overwraps according to the invention provide excellent damping and abrasion protection at junction points of elongated items such as wiring harnesses. Such overwraps are especially versatile as to form, size and flexibility and readily accommodate elongated items of various sizes and angular orientations, the overwraps being especially effective when used in conjunction with other types of protective sleeving, such as convolute tubing.

What is claimed is:

1. An overwrap for protecting elongated items, said overwrap comprising:

a flexible substrate having first and second surfaces [oppositely disposed] *facing away from one another*, said substrate being resiliently biased so as to form a tube wherein a portion of said first surface overlies a portion of said second surface, said tube having a central space for receiving said elongate items;

a first attachment means positioned on said first surface and extending substantially thereover;

a second attachment means positioned on said second surface and extending substantially thereover, said second attachment means being engageable with said first attachment means for removably attaching said first and second surfaces to one another when said first surface is brought into contact with said second surface, said first and second surface portions being engageable with one another to affix said tube around said elongated items; and wherein said tube comprises a first tubular segment defining a first central space and a second tubular segment defining a second central space, said first and second tubular segments being connected to one another with said first and second central spaces in communication with one another.

2. An overwrap according to claim 1, wherein said first attachment means comprises a multiplicity of hooks extending from said first surface and said second attachment means comprises a multiplicity of loops extending from said second surface.

3. An overwrap according to claim 1, wherein said substrate comprises a non-woven material.

4. An overwrap according to claim 1, wherein said substrate comprises a nylon felt.

5. An overwrap according to claim 1, wherein said first and said second tubular segments are oriented angularly with respect to one another.

6. An overwrap according to claim 1, wherein said first tubular segment is oriented at approximately 90 [.quadrature.] degrees to said second tubular segment.

7. An overwrap according to claim 1, wherein said tubes are comprised of a non-woven material.

8. An overwrap according to claim 1, wherein said tubes are comprised of a nylon felt.

9. An overwrap for protecting elongated items, said overwrap comprising:

a flexible substrate having first and second surfaces oppositely disposed;

a first attachment means positioned on said first surface and extending substantially thereover;

a second attachment means positioned on said second surface and extending substantially thereover, said second attachment means being engageable with said first attachment means for removably attaching said first and second surfaces to one another when said first surface is brought into contact with said second surface;

a first substrate portion being turned back upon a remainder of said substrate to form a first reverse fold, said first reverse fold defining a first channel between said first substrate portion and said remainder for receiving said elongated items; and a second substrate portion being turned back upon said remainder of said substrate into overlapping relation with said first substrate portion, said first attachment means on one of said first and second substrate portion engaging said second attachment means on the other of said first and second substrate portions to hold said first and second substrate portions in overlapping relation to secure said reverse fold defining said first channel;

a third substrate portion being turned back upon said remainder of said substrate to form a second reverse fold, said second reverse fold defining a second channel between said third substrate portion and said remainder, said third substrate portion being in overlapping relation with said second substrate portion, one of said first and second attachment means on said third substrate portion engaging the other of said first and second attachment means on said second substrate portion to secure said second reverse fold defining said second channel.

10. An overwrap according to claim 9, further comprising a score line positioned on said substrate, said score line defining a boundary between said first substrate portion and said remainder of said substrate, said score line facilitating said reverse fold.

11. An overwrap according to claim 10, wherein said score line is printed on one of said surfaces of said substrate.

12. An overwrap according to claim 10, wherein said score line comprises a groove in one of said surfaces of said substrate.

13. An overwrap for protecting elongated items, said overwrap comprising:

a first tube defining a first central space for receiving said elongated items, said first tube having an inwardly facing surface and an outwardly facing surface oppositely disposed, a first slit being formed lengthwise along said first tube, said first slit forming a first opening providing access to said first central space;

a first attachment means positioned on said inwardly facing surface and extending substantially thereover, and a second attachment means positioned on said outwardly facing surface and extending substantially thereover, said first and second attachment means being removably engageable with one another by bringing said inwardly and outwardly facing surfaces of said first tube into overlapping relation along said first slit to close said first opening;

a second tube defining a second central space for receiving said elongated items, said second tube being attached to said first tube, said second central space being in communication with said first central space, said second tube having an inwardly facing surface and an outwardly facing surface oppositely disposed, a second slit being formed lengthwise along said second tube, said second slit forming a second opening providing access to said second central space; and said first attachment means being positioned on said inwardly facing surface of said second tube and extending substantially thereover, said second attachment means being positioned on said outwardly facing surface of said second tube and extending substantially thereover, said first and second attachment means on said second tube being removably engageable with one another by bringing said inwardly and outwardly facing surfaces of said second tube into overlapping relation along said second slit to close said second opening.

14. An overwrap according to claim 13, wherein said first attachment means comprises a multiplicity of hooks extending from said first surfaces and said second attachment means comprises a multiplicity of loops extending from said second surfaces.

*15. An overwrap according to claim 1, wherein said first attachment means extends substantially over said first surface and said second attachment means extends substantially over said second surface.*

*16. An overwrap according to claim 1, wherein at least one of said first or second tubular segments is resiliently biased into its tubular form.*

*17. An overwrap for protecting elongated items, said overwrap comprising:*

*a unitary flexible substrate biased to form a tube having a central space for receiving said elongate items; and*

*wherein said tube comprises a first tubular segment defining a first central space and a second tubular segment defining a second central space, said first and second central spaces being joined in communication with one another at substantially 90 degrees to one another wherein said flexible substrate has first and second surfaces facing away from one another in oppositely disposed fashion, wherein a portion of said first surface overlies and engages a portion of said second surface to form said first and second tubular segments.*

*18. An overwrap according to claim 17, wherein said flexible substrate further comprises a first attachment means on said first surface and a second attachment means on said second surface, said second attachment means being engageable with said first attachment means for removably attaching said first and second surfaces to one another.*

*19. An overwrap according to claim 18, wherein said first attachment means comprises a multiplicity of hooks extending from said first surface and said second attachment means comprises a multiplicity of loops extending from said second surface.*

*20. An overwrap according to claim 17, wherein said flexible substrate is comprised of a non-woven material.*

*21. An overwrap according to claim 17, wherein said flexible substrate is comprised of a nylon felt.*

*22. An overwrap according to claim 17, wherein at least one of said first or second tubular segments is resiliently biased into its tubular form.*

* * * * *